3,338,843
CONTROL OF CATALYST ACTIVITY OF A FLUORINE CONTAINING ALUMINA CATALYST
Anthony George Goble, Kenneth Tupman, and Michael John Telfer, Sunbury-on-Thames, Middlesex, England, assignors to The British Petroleum Company Limited, London, England, a joint stock corporation of Great Britain
No Drawing. Filed Feb. 19, 1963, Ser. No. 259,751
Claims priority, application Great Britain, Feb. 20, 1962, 6,541/62
6 Claims. (Cl. 252—442)

This invention relates to the preparation of catalysts suitable for hydrocarbon conversion and comprising a halogenatable refractory oxide, halogen and, if desired, a hydrogenating metal.

Catalysts comprising a halogenatable refractory oxide, halogen, and, optionally, a hydrogenating metal are well known to have been proposed for use or used in a number of hydrocarbon conversion reactions. Particularly well known examples are platinum-alumina-fluorine and cobalt oxide-molybdenum oxide-alumina-fluorine catalysts. In preparing these catalysts the halogen may be added in a variety of ways, for example by treating the refractory oxide with hydrogen halide as a gas or as an aqueous solution, with a gaseous halohydrocarbon, for example tertiary butyl halide, or with the vapour of a fluorine compound of general formula:

(where X is carbon or sulphur and Y is fluorine or hydrogen) as disclosed in U.K. Patent Application No. 20525/61, now United Kingdom Patent No. 956,684, issued April 29, 1964.

Due, it is believed, to the acidity conferred by the halogen, the catalysts have activity both for the cracking and the isomerisation of hydrocarbons. In certain processes it may be desired to have both these reactions occurring to a substantial extent but in other processes it may be desirable for one or other of them to be reduced. During investigations on the relative extent to which these two reactions occurred with different catalysts it was, surprisingly, found that quite different results could be obtained with catalysts having the same halogen contents and being also in other physical and chemicals respects apparently identical.

This apparent lack of reproducibility of results has now been traced to variations in the relatively small hydrogen content of the catalysts.

Accordingly the present invention is concerned with a process for the preparation of hydrocarbon conversion catalysts comprising a halogenatable refractory oxide, halogen and, if desired, a hydrogenating metal, which comprises adding halogen to the halogenatable refractory oxide and simultaneously or subsequently subjecting the oxide to an elevated temperature to reduce the hydrogen content of the catalyst to less than 1% wt., and to control the hydrogen content according to the extent of cracking and isomerising activity required in the catalyst, said control being exercised by increasing the temperature and/or the duration of the treatment if reduction of the hydrogen content and thereby increase in hydrocarbon cracking activity is required.

The amount of hydrogen present in the catalyst may be quite small but it nevertheless has a considerable effect on the relative activity of the catalyst for hydrocracking or isomerisation. The precise form in which the hydrogen is present in the catalyst is uncertain and it may be combined with oxygen as hydroxyl groups or water. However, the hydrogen content can be determined irrespective of its form by standard methods and it is therefore a convenient criterion for assessing catalyst activity. The amount of hydrogen in the finished catalyst depends on the original hydrogen content and on the temperature and length of time of the treatment at elevated temperature, increase of either decreasing the hydrogen content. For increased cracking with reduced isomerisation the hydrogen content should be less than 0.25% wt. and preferably less than 0.20% wt. For increased isomerisation and reduced cracking the hydrogen content should be within the range 0.20% wt. to 1.0% wt., preferably 0.20% to 0.40% wt. Since hydrogen contents above 1.0% wt. give catalysts of low activity for isomerisation and for cracking these are avoided.

The temperature and duration of the treatment of elevated temperature can be determined by experiment for any given catalyst and desired hydrogen content. As stated above, increase of temperature and duration both tend to decrease the hydrogen content. In general the temperature should be above normal drying temperatures (i.e. above about 105° C.) and below that at which damage to the catalyst may occur. It is particularly preferred that the temperature should not be so high as to result in a substantial loss in surface area. In practice, temperatures of from 400–550° C. are suitable for periods of from 10 minutes to 24 hours.

Since the aim of the treatment at elevated temperature is to control the hydrogen content it is desirably carried out under non-reducing conditions, i.e. either inert or oxidising conditions. Hydrogen and also water vapour are thus desirably absent. The treatment may be carried out under static conditions, but it is preferably carried out in a stream of a non-reducing gas, for example nitrogen or air.

When the halogenation of the catalyst is carried out by impregnation with an aqueous solution of, for example, hydrofluoric acid, at room temperature the treatment at elevated temperature must be given subsequently. When, however, the halogenation is itself carried out at elevated temperature, as when using a gaseous halogen-containing compound in, if desired, a carrier gas, it may be possible to control the hydrogen to a substantial extent by the choice of temperature during the halogenation. However, a subsequent treatment may also be given by, for example, continuing to pass the carrier gas for a period after the halogenation proper.

Any convenient form of halogenation may be used and the preferred halogen is fluorine. The amount of halogen in the finished catalyst may be within the range 0.1 to 15% wt., preferably 1–10% wt.

The effect of variation of hydrogen content on cracking and isomerising activity applies to catalysts which are otherwise similar, having for example similar halogen contents. However, the amount of halogen also affects the cracking and isomerising activity and it has been found that low or moderate halogen contents gives maximum cracking activity, while isomerising activity increases with increasing halogen content. The halogen content for high hydrocracking activity is preferably 0.1 to 3% wt., more particularly 1 to 2.5% wt., and for high isomerising activity is above 3 to 15% wt., more particularly 5 to 10% wt.

Preferably the catalyst contains one or more hydrogenating metals, which may be metals selected from Groups VIa and VIII of the Periodic Table and these are desirably added to the catalyst before the halogen. Particularly suitable metals are the platinum group metals, preferably platinum itself, but molybdenum with or without an iron group metal, particularly cobalt, may also be used. The metals may be present in the catalyst as such, or as compounds for example oxides or sulphides. In the case of the platinum group metals, these are preferably present as metals in an amount from 0.01 to 5% wt. of the total catalyst. In the case of the Group VIa metals, these are preferably present as oxides or sulphides and if an iron group metal is present in combination this is also preferably present as an oxide or sulphide or is combined with Group VIa metal compound, as, for example, cobalt molybdate. The Group VIa metal compound is preferably present in an amount from 5 to 40% wt. (calculated as the hexavalent metal oxide) by weight of total catalyst and the iron group metal compound is preferably present in an amount from 0.1 to 10% wt. (calculated as the divalent metal oxide) by weight of total catalyst.

The halogenatable refractory oxide, besides being halogenatable should also clearly have the required physical characteristics to render it suitable for use in hydrocarbon conversion catalysts.

It is preferably a refractory oxide from Group II, III or IV of the Periodic Table or a mixture of two or more of these oxides. Preferred carriers are alumina or mixtures containing at least 50% wt. of alumina.

The pesent invention includes catalysts when prepared as described above.

The present invention includes hydrocarbon conversion processes which use catalysts prepared as described above. The processes are preferably those carried out in the presence of hydrogen and may include any process in which either hydrocracking or isomerisation plays a part. The process is, however, preferably one in which either hydrocracking or isomerisation plays a predominating part. It may thus be for example a hydrocracking process for the production of hydrocarbons of lower carbon number than the feedstock, an isomerisation process for the conversion parafins in the gasoline boiling range to iso-paraffins, particularly the conversion of n-pentane and n-hexane, an isomerisation process for the conversion of normally solid waxy paraffin hydrocarbons, to iso-paraffins, or a process for reducing the pour point of hydrocarbon fractions boiling above 150° C. In hydrocracking processes the hydrocracking activity should normally predominate and in isomerisation processes the isomerisation activity should normally predominate, but there may be occasions when a balance of activities will be desired. The principal purpose of the present invention is to allow the ready control of the relative cracking and isomerisation activities of halogenated catalysts and once this can be done it will be apparent that the catalysts can be adjusted to any particular desired operation.

The invention is illustrated by the following examples.

*Example 1*

65 g. of ⅛" by ⅛" pellets of a commercially available platinum alumina composite containing 0.58% wt. of platinum and 0.81% wt. of chlorine and having a surface area of 440 m.²/g. were impregnated with 100 ml. of 5% aqueous hydrofluoric acid at 0° C. for 30 minutes. The composite was then dried at 120° C. for 4 hours. The fluorine content of the catalyst was 6% wt.

The catalyst was split into 5 equal portions which were then treated by passing a current of dry nitrogen over them at 500° C. for varying periods of time. Each portion was then tested for isomerisation and cracking activity in a hydrocatalytic process operating under the following conditions Feedstock _____ n-hexane/hydrogen.
Temperature _____ 300° C.
Pressure _____ Atmospheric p.s.i.g.
Space velocity _____ 0.5 v./v./hr.

Inspection data on the catalysts and the results obtained are given in Table 1 below.

TABLE 1

| Time of treatment at 500° C., mins | 10 | 15 | 60 | 80 | 150 |
|---|---|---|---|---|---|
| Catalyst: | | | | | |
| Fluorine Content, percent wt | 6.0 | 5.9 | 5.8 | 6.2 | 6.1 |
| Hydrogen, percent wt | 0.40 | 0.30 | 02.5 | 0.20 | 0.18 |
| Surface area, m.²/g | 386 | 397 | 393 | 380 | 382 |
| Results obtained at 0.5 v./v./hr.: | | | | | |
| Total conversion, percent wt | 46.5 | 67.5 | 76.7 | 77.7 | 81.0 |
| Hydrocracking (production of $C_5$ and lower hydrocarbons), percent wt | 6.0 | 6.8 | 7.6 | 12.5 | 14.0 |
| Isomerisation (production of $C_5$ iso-paraffins), percent wt | 40.5 | 60.7 | 69.1 | 65.2 | 67.0 |
| 2,2-dimethylbutane, percent wt | 2.5 | 7.0 | 10.9 | 12.0 | 12.5 |
| Selectivity for isomerisation (total isomers total conversion), percent | 86.7 | 90.0 | 90.1 | 84.0 | 82.7 |

It will be seen that the treatment in a stream of nitrogen at 500° C. has not affected the fluorine content or surface area appreciably and that these remain constant. The hydrogen content was however progressively reduced as the treatment was increased. The effect of the reduced hydrogen content has been to increase the total conversion, and the hydrocracking.

The isomerisation activity increased at first but it reached a maximum and at low hydrogen contents it decreased again. At a hydrogen content of 0.40 and above, the catalyst had relatively low activity for both hydrocracking and isomerisation, and at a hydrogen content of 1.0 and above it was virtually inactive. It is thus possible to divide the catalyst into three types (i) Those with a relatively high hydrogen content and low overall activity.

(ii) Those with a moderate hydrogen content, maximum isomerisation activity and moderate hydrocracking activity.

(iii) Those with a low hydrogen content, moderate isomerisation activity and high hydrocracking activity.

The catalysts shown in the last 4 columns of Table 1 (i.e. those catalysts which had been treated in nitrogen for from 15 to 150 mins.) were also tested for hydrocracking and isomerisation activity using a lower space velocity of 0.2 v./v./hr. but otherwise similar conditions. The results obtained, which are given inTable 2 below show the same trends as those of Table 1.

TABLE 2

| Time of treatment at 500° C., mins | 15 | 60 | 80 | 150 |
|---|---|---|---|---|
| Total Conversion, percent wt | 80.5 | 79.4 | 80.9 | 82.6 |
| Hydrocracking (production of $C_5$ and (lower hydrocarbons), percent wt | 11.9 | 12.0 | 19.7 | 26.2 |
| Isomerisation (production of $C_5$ iso-paraffins), percent wt | 68.6 | 67.4 | 61.2 | 56.4 |
| 2,2-dimethylbutane, percent wt | 12.6 | 13.4 | 12.1 | 11.1 |
| Selectivity for isomerisation, percent | 85.2 | 86.0 | 75.7 | 68.3 |

*Example 2*

25 g. of ⅛" x ⅛" pellets of a commercially available platinum-alumina composite containing 0.58% wt. of platinum and 0.81% wt. of chlorine and having a surface area of 440 m.² g. were fluorinated by contacting with dry carbon tetrafluoride gas flowing at 150 ml./min. for 20 minutes at an initial reaction temperature of 440° C. The fluorine content of the catalyst was 5.0% wt.

The catalyst was split into 4 equal portions. One portion was not treated further, the other portions were treated by passing a current of nitrogen over them at 500° C. for varying periods of time. Each portion was then tested for isomerisation and cracking activity using the feedstock and process conditions given in Example 1, the space velocity being 0.5 v./v./hr.

Inspection data on the catalysts and the results obtained are given in Table 3 below.

TABLE 3

| Time of treatment at 500° C., mins | Nil | 10 | 60 | 120 |
|---|---|---|---|---|
| Catalyst: | | | | |
| Fluorine content, percent wt | 5.0 | 5.2 | 5.0 | 5.1 |
| Hydrogen content, percent wt | 0.24 | 0.19 | 0.12 | 0.10 |
| Surface area, m.²/g | 417 | 418 | 414 | 415 |
| Results obtained at 0.5 v./v./hr.: | | | | |
| Total conversion, percent wt | 73.7 | 74.5 | 78.2 | 82.4 |
| Hydrocracking, percent wt | 3.5 | 4.2 | 14.7 | 23.8 |
| Isomerisation, percent wt | 70.2 | 70.3 | 63.5 | 58.6 |
| Selectivity for isomerisation, percent | 95.2 | 94.4 | 81.2 | 71.2 |

The results are similar to those of Example 1 but it will be seen that fluorinating the catalyst at an elevated temperature has resulted in a catalyst with a lower initial hydrogen content. This hydrogen content can, however, be further reduced by treatment in nitrogen at 500° C.

The increased total conversion with decreased hydrogen content is accounted for by an increase in hydrocracking which is greater than the decrease in isomerisation and the catalysts of this example are similar to those of Types (ii) and (iii) of Example 1.

We claim:
1. In a process for the preparation of hydrocarbon conversion catalysts comprising a fluorinatable refractory oxide consisting of at least 50% alumina and containing a hydrogenating metal and from 0.1 to 15% wt. of fluorine by adding said fluorine to said fluorinatable refractory oxide, the improvement which consists of subjecting the at least partially fluorinated oxide under anhydrous, non-reducing condition to a temperature in the range of 400 to 555° C. for from 10 minutes to 24 hours to lower the hydrogen content of the catalyst to 0.40% by wt. or less and to control the hydrogen content according to the extent of cracking and isomerising activity required in the catalyst, said control being exercised by adjusting the process conditions to give a hydrogen content of from 0.20% wt. to 0.40% wt. for high isomerising activity and a hydrogen content of less than 0.20% wt. for high cracking activity.

2. A process as claimed in claim 1 wherein the treatment at elevated temperature is carried out after the fluorination.

3. A process as claimed in claim 1 wherein the treatment at elevated temperature is carried out at least partially during the fluorination.

4. A process as claimed in claim 1 wherein the catalyst has a fluorine content of from 3 to 15% wt.

5. A process as claimed in claim 1 wherein the catalyst has a fluorine content of from 0.1 to 3% wt.

6. A process as claimed in claim 1 wherein the treatment at elevated temperature is carried out under non-reducing conditions.

References Cited

UNITED STATES PATENTS

| | | | |
|---|---|---|---|
| 2,759,897 | 8/1956 | Haensel et al. | 252—442 |
| 3,121,696 | 2/1964 | Hoekstra | 252—441 |
| 3,123,573 | 3/1964 | Carr | 252—442 |
| 3,137,656 | 6/1964 | Mason et al. | 252—441 X |
| 3,165,479 | 1/1965 | Burk et al. | 252—442 |

OSCAR R. VERTIZ, *Primary Examiner.*

MAURICE A. BRINDISI, *Examiner.*

E. STERN, *Assistant Examiner.*

UNITED STATES PATENT OFFICE
CERTIFICATE OF CORRECTION

Patent No. 3,338,843                                August 29, 1967

Anthony George Goble et al.

It is hereby certified that error appears in the above numbered patent requiring correction and that the said Letters Patent should read as corrected below.

Column 4, TABLE 1, fourth column, line 2 thereof, for "02.5" read -- 0.25 --; same table, first column, line 10 thereof, for "$C_5$" read -- $C_6$ --; same column 4, TABLE 2, first column, line 3 thereof, before "lower" strike out the opening parenthesis; column 6, line 3, for "condition" read -- conditions --.

Signed and sealed this 1st day of October 1968.

(SEAL)
Attest:

Edward M. Fletcher, Jr.                                EDWARD J. BRENNER
Attesting Officer                                             Commissioner of Patents